(12) United States Patent
Foltz

(10) Patent No.: US 12,149,395 B1
(45) Date of Patent: Nov. 19, 2024

(54) COEFFICIENT GENERATOR

(71) Applicant: Keysight Technologies, Inc., Santa Rosa, CA (US)

(72) Inventor: Garrett Foltz, Wilsonville, OR (US)

(73) Assignee: Keysight Technologies, Inc., Santa Rosa, CA (US)

( * ) Notice: Subject to any disclaimer, the term of this patent is extended or adjusted under 35 U.S.C. 154(b) by 927 days.

(21) Appl. No.: 17/169,709

(22) Filed: Feb. 8, 2021

(51) Int. Cl.
*H04L 27/26* (2006.01)
*G06F 9/54* (2006.01)
*G06F 17/14* (2006.01)

(52) U.S. Cl.
CPC .......... *H04L 27/2651* (2021.01); *G06F 9/544* (2013.01); *G06F 17/142* (2013.01)

(58) Field of Classification Search
CPC ............. H04L 27/2651; H04B 17/0087; G06F 13/4031
See application file for complete search history.

(56) References Cited

U.S. PATENT DOCUMENTS

| | | | |
|---|---|---|---|
| 8,229,014 B2 | 7/2012 | Cousineau | |
| 8,275,053 B2 * | 9/2012 | Bang | H04L 25/0222 375/230 |
| 10,103,823 B1 * | 10/2018 | Kyrolainen | H04B 17/3912 |
| 2010/0063791 A1 * | 3/2010 | Wen | H04B 17/336 703/13 |
| 2012/0209900 A1 * | 8/2012 | Sorokine | H04L 25/0216 708/309 |
| 2013/0006601 A1 * | 1/2013 | Mlinarsky | H04W 24/06 703/23 |
| 2019/0131957 A1 * | 5/2019 | Hosaka | H04B 17/3912 |

OTHER PUBLICATIONS

Mengjia Yan, Based on slides from Daniel Sanchez, Multithreading Architectures, Apr. 2, 2020, M.I.T., Computer Science And Artificial Intelligence Lab, Slide 5 (Year: 2020).*

Takuma Iwata, et al., "An FPGA-Based Change-Point Detection for 10Gbps Packet Stream", IEICE Trans. Inf. & Syst., vol. E102-D, No. 12, p. 2366, Dec. 2019.

* cited by examiner

*Primary Examiner* — Andrew Caldwell
*Assistant Examiner* — Carlo Waje

(57) ABSTRACT

A device performs operations on a plurality of streams of data. The device includes a frequency domain converter logic that transforms input signal samples of radio frequency (RF) signal impulse response data to frequency domain signal results. A first arbiter has a plurality of inputs. Each input from the plurality of inputs receives one stream of data from a plurality of streams of data. Each stream of data in the plurality of streams of data includes a stream of RF signal impulse response data. For each arbitration cycle, the first arbiter selects an input signal sample from one of the plurality of inputs to forward to the frequency domain converter logic. Multi-stream first-in-first-out (FIFO) memory that has a separate FIFO buffer for each stream of data in the plurality of streams of data. For each input signal sample transformed by the frequency domain converter logic into a frequency domain signal result, the frequency domain converter logic places the frequency domain signal result into a FIFO buffer of the multi-stream FIFO memory that corresponds to a memory stream from which the input signal sample originated.

20 Claims, 6 Drawing Sheets

COEFFICIENT GENERATOR

BACKGROUND

A signal generator generates electronic signals with set properties of amplitude, frequency and wave shape. The generated signals can be used as a stimulus for designing and testing electronic systems.

When a generated signal carries multiple streams of data, a radio frequency (RF) channel emulation scenario can be defined by RF channel propagation descriptors that are simplified to sets of time varying gain and delay pairs that define channel impulse responses of the channel emulation scenario. A coefficient processor can be used to covert the RF channel propagation descriptors into filter coefficients, for example, to facilitate using a fast Fourier transform (FFT) process to perform convolution of signals. Filter coefficients are used, for example, as input to frequency domain FFT filters.

DETAILED DESCRIPTION

Figure 1:
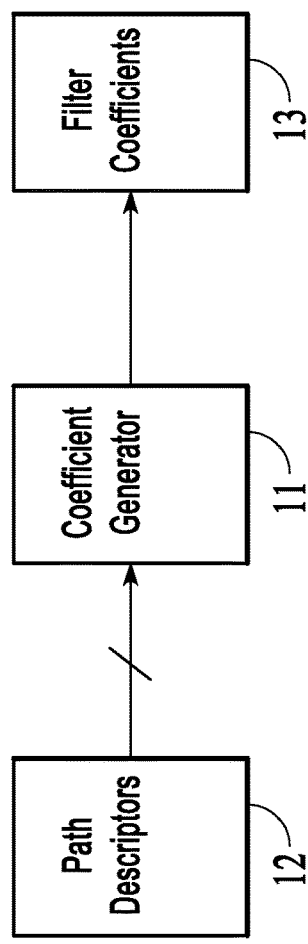
FIG. 1 shows a simplified overview of a coefficient generator.

FIG. 1 shows a simplified overview of a coefficient generator 11 that receives radio frequency (RF) channel path descriptors 12 for multiple data streams and produces filter coefficients 13 to be used for a frequency domain fast Fourier transform (FFT) filter. For example, the data streams may have differing data rates and coefficient generator 11 processes the data streams serially in a multiplexed fashion to reduce the amount of hardware necessary to process the multiple data streams.

Figure 2:
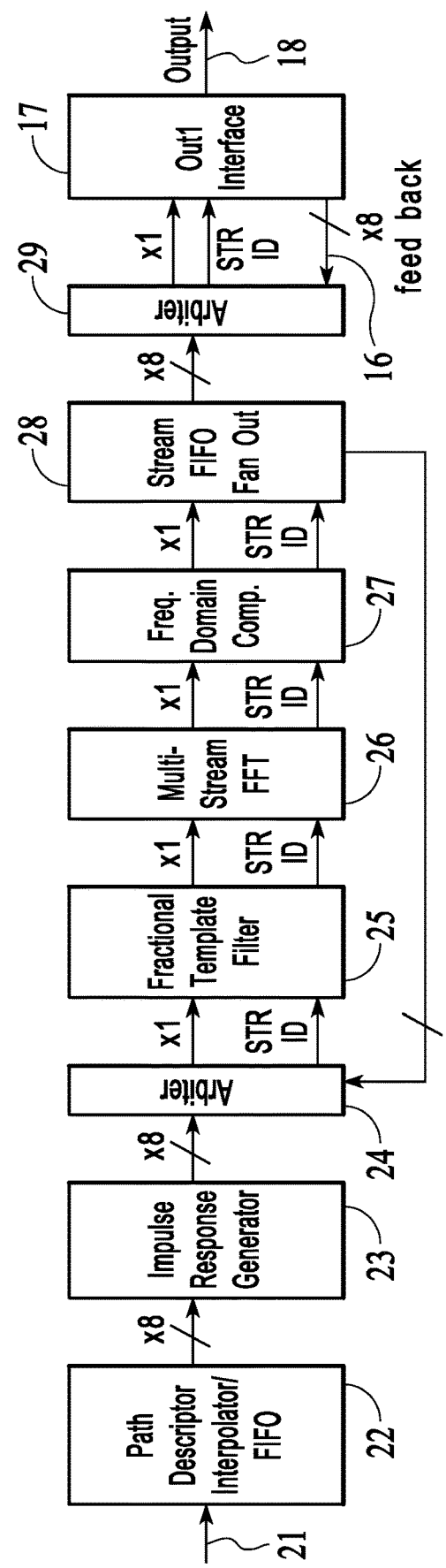
FIG. 2 shows a simplified signal flow block diagram for the coefficient generator shown in FIG. 1.

FIG. 2 shows a simplified signal flow block diagram for coefficient generator 11. An input 21 to a path descriptor/interpolator FIFO 22 consists of multiple ambidextrous data streams presented in parallel to coefficient generator not shown. For example, in one embodiment there are up to eight ambidextrous data streams where single data packets are presented per clock cycle at each input stream. For example, data packet consists of a RF channel propagation descriptor having marker, gain, integer delay, and fractional delay that provide channel input responses (CIR) for a given RF channel emulation scenario. Groups of gain and delay pairs make up a single CIR. For example, the number of paths in a single CIR is programmable.

Path descriptor/interpolator FIFO 22 provides an interpolator stage at the input of each stream with separately controlled interpolation ratios. For example, each interpolator consists of a twenty-seven-tap fractional template filter which brings the interpolation image suppression on the order of 70 dB and the amplitude error around 0.025 dB.

For example, in a multi-cycle design, it takes nineteen clock cycles to compute a single gain/delay pair using this interpolator. This limits the coefficient output rate to the circuit clock rate divided by nineteen.

Impulse response generator 23 takes gain/delay pairs and creates a pseudo-impulse response data stream. That is, as indicated above, at input, a data packet consists of a marker, gain, integer delay, and fractional delay for a given propagation path (p). The marker m(p) is four bits of marker data. The gain g(p) is the complex gain of a path and has sixteen bits of signed data for each in-phase and quadrature components. The integer delay is an index integer that has fourteen bits of unsigned data. The fraction delay r(p) is a fractional index with ten bits of unsigned data. The number of bits of resolution between the integer and fractional delay bits is adjustable.

The index is the delay of the path normalized to the data sample rate. The fractional index is the remainder of the integer index normalization. Impulse response generator 23 takes these gain/delay pairs and creates a pseudo-impulse response data stream, according to the following equation:

$$h_{pseudo\_CIR} = \sum_{p=0}^{P} G(p)\partial(n-i(p)-r(p))$$

It is a pseudo-impulse response because the fractional delay of the impulse is yet to be realized at this stage in the conversion. Essentially, impulse response generator 23 inserts zeros between the gain/delay pairs and passes the fractional delay with the data at the integer sample index. Realizing the fractional delay is performed by a fractional template filter 25.

Impulse response generator 23 knows the boundaries between sets of gain/delay samples and creates the appropriate impulse response based on data programmed into a FADING_NUM_PATHS register for each stream.

Impulse response generator 23 presents eight data streams in parallel to arbiter 24. Arbiter 24 controls the flow of the input data through fractional template filter 25 and on to frequency domain conversion stages which include a multi-stream fast Fourier transform (FFT) block 26 and a frequency domain compensation block 27. Fractional template filter 25, multi-stream fast Fourier transform (FFT) block 26 and frequency domain compensation block 27 together form frequency domain converter logic that transforms input signal samples of radio frequency (RF) signal impulse response data to frequency domain signal results, i.e., filter coefficients 13 to be used for a frequency domain fast Fourier transform (FFT) filter.

Arbiter 24 selects one data stream at a time to serially traverse through fractional template filter 25 and the frequency domain conversion stages. After the frequency domain conversion stages, the data stream fans out so that results for each data stream are placed into a dedicated post-FFT first-in-first-out (FIFO) memory within stream FIFO fan out block 28, where each data stream has its own dedicated post FFT FIFO.

FIFO fan out block 28 sends control signals back to arbiter 24 so that the dedicated post FFT FIFO for each data stream is kept at an adequate level as predetermined to allow efficient use of data streams as they are further processed after leaving coefficient generator 11. The data streams are time multiplexed and identified via a stream ID (STR ID). The depths and control thresholds for the dedicated post FFT FIFO are designed such that the latency through the fractional template filter 25 and the frequency domain conversion stages can be accommodated without overflowing or underflowing the dedicated post FFT FIFO for each data stream.

Based on the control signals from FIFO fan out block 28, arbiter 24 selects which data stream is selected to forward to fractional template filter 25 so that all of the dedicated post FFT FIFOs are kept at their adequate level.

An arbiter 29 selects which data stream within FIFO fan out block 28 to place through to an output interface 17 which produces output 18 of coefficient generator 11. For example, output interface 17 uses control signals 16 to make requests for which data stream from within post-FFT FIFOs from FIFO fan out block 28 is to be selected by arbiter 29 to place through to output interface 17.

Fractional template filter 25 is an arbitrary time multiplexed filter with the ability to integrate multiple impulse responses on an integer index boundary. Fractional template filter uses a pseudo impulse response from an impulse response generation and a fractional delay to generate a fractional template filter and outputs time domain response for the multiple streams. Each sample of time domain response from fractional template filter includes a stream identifier which identifies the data stream for the sample.

Figure 3:
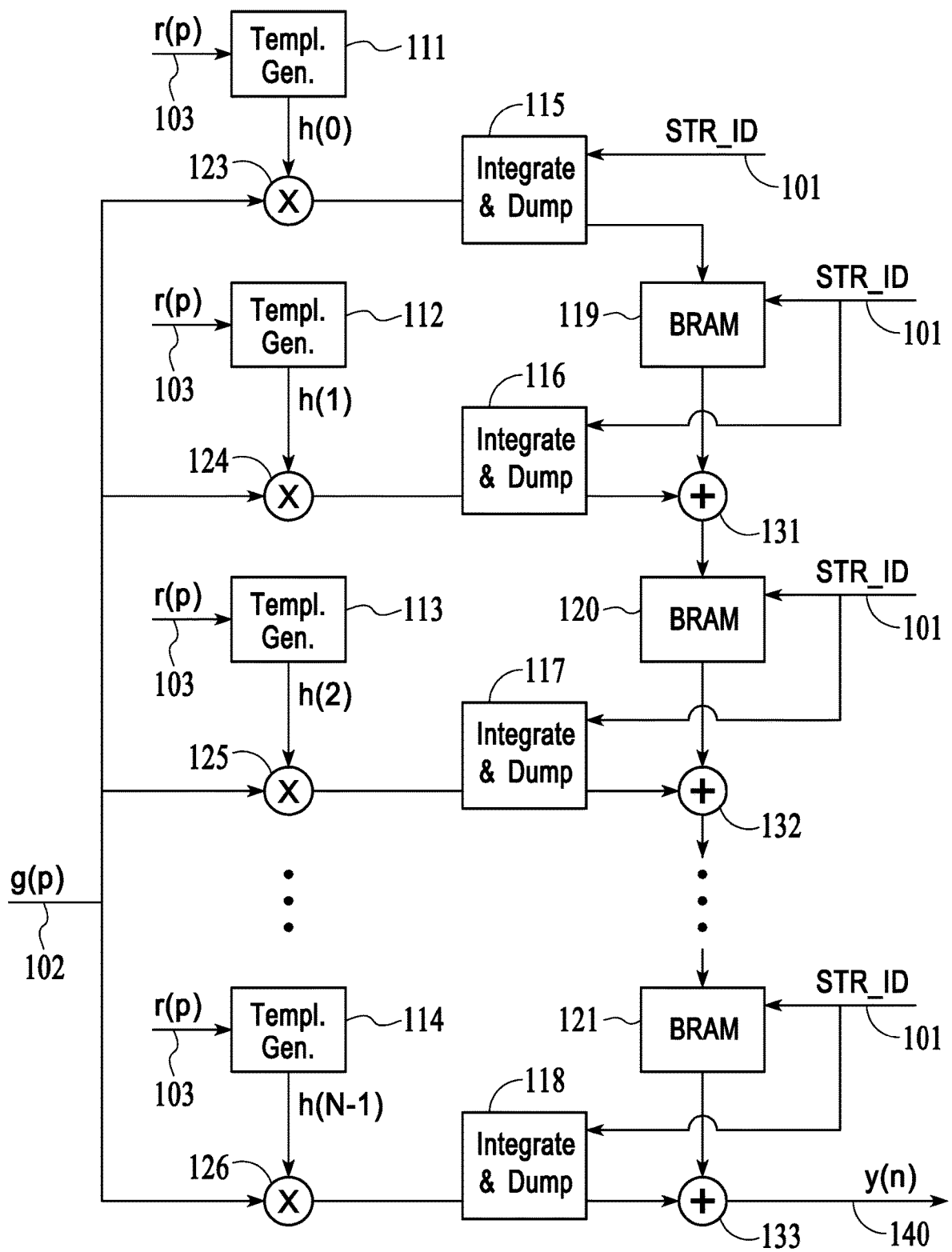
FIG. 3 shows a simplified block diagram illustrating an implementation of a fractional template filter within the coefficient generator shown in FIG. 1.

FIG. 3 is a simplified block diagram for fractional template filter 25. Fractional template filter 25 is represented in FIG. 3 by a template generator 111, a template generator 112, a template generator 113, a template generator 114, integrate and dump logic block 115, integrate and dump logic block 116, integrate and dump logic block 117, integrate and dump logic block 118, block random access memory (BRAM) 119, BRAM 120 and BRAM 121, a multiplier 123, a multiplier 124, a multiplier 125, a multiplier 126, an adder 131, an adder 132 and an adder 133 connected as shown.

Input to fractional template filter 25 includes gain g(p) 102, fraction delay r(p) 103 and stream ID 101. Output y(n) from fractional template filter 25 is forwarded to multi-stream FFT block 26.

To implement each integrate and dump logic block as a recursive integrator, the following response is needed:

$$H(z) = \frac{1}{1 - z^{-1}}$$

Which can be represented in the time domain as:

$$y_n = x_n + y_{n-1}$$

For hardware implementations that cannot meet timing without additional registers, the above equation needs to be pipelined with delay. To perform the pipelining, consider three calculations:

$$y_{n+3} = x_{n+3} + y_{n+2}$$

$$y_{n+2} = x_{n+2} + y_{n+1}$$

$$y_{n+1} = x_{n+1} + y_n$$

Substitution in the above equations can be used to calculate the following:

$$y_{n+3} = x_{n+3} + (x_{n+2} + (x_{n+1} + (x_n + y_n)))$$

$$y_n = x_n + x_{n-1} + x_{n-2} + x_{n-3} + y_{n-3}$$

$$H(z) = \frac{1 + z^{-1} + z^{-2} + z^{-3}}{1 - z^{-3}} = \frac{1}{1 - z^{-1}}$$

Each delay (z) can be implemented with a memory unit. In order to convert this representation to a multi-stream architecture, each memory unit must act as a BRAM unit that is indexed by the stream ID that is currently being processed. For example, FIG. 4 represents such an implementation.

Figure 4:
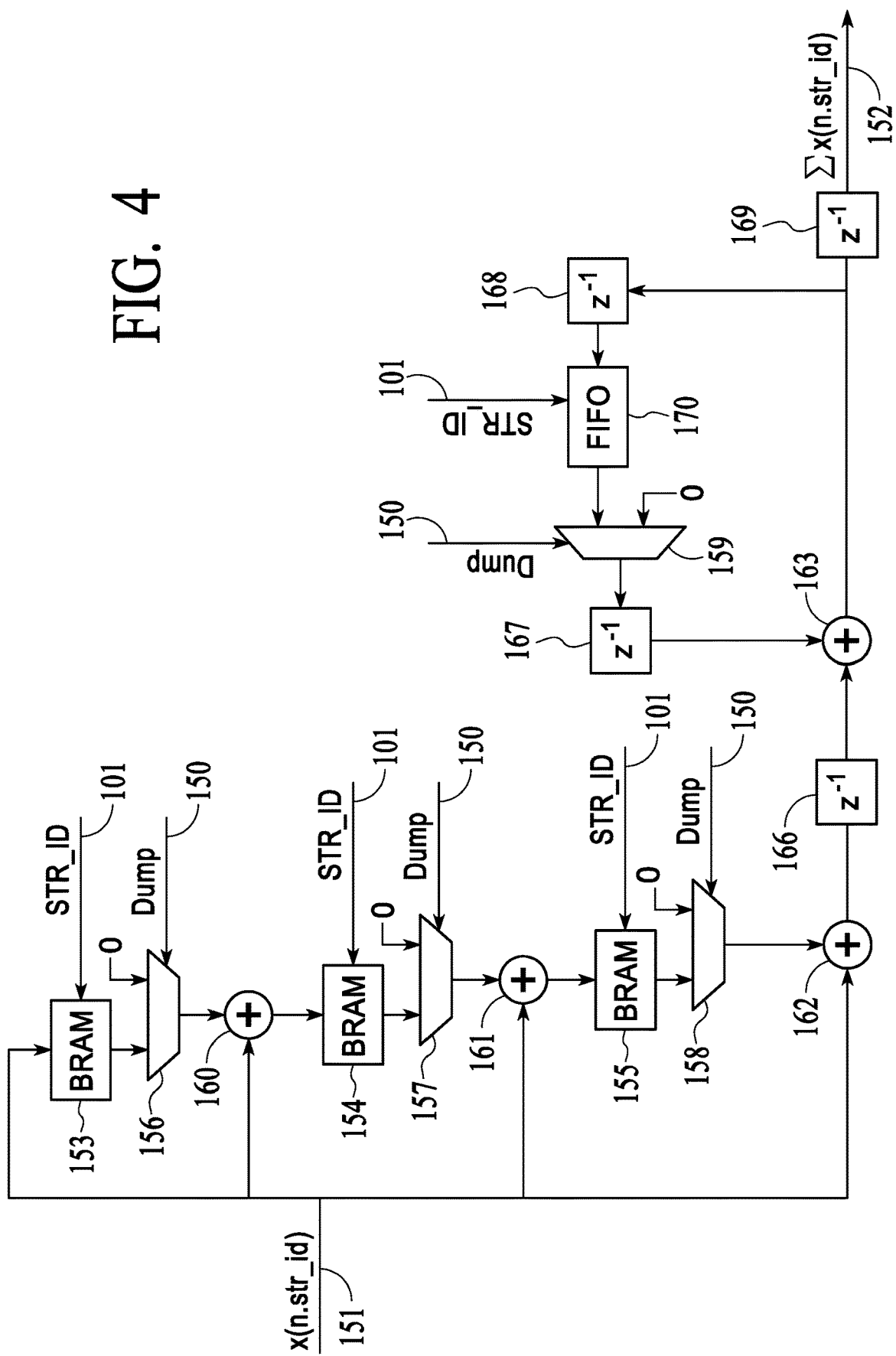
FIG. 4 shows a simplified block diagram of an impulse response generator within the fractional template filter shown in FIG. 3.

FIG. 4 shows an implementation of each integrate and dump logic block shown in FIG. 3. The integrate and dump logic block is shown to include a BRAM 153, a BRAM 154, a BRAM 155, a multiplexor 157, a multiplexor 158, a multiplexor 159, an adder 160, an adder 161 an adder 162, a first-in-first-out (FIFO) memory 170, an adder 163, a delay 166, a delay 167, a delay 168 and a delay 166 connected as shown. Input to the integrate and dump logic block is the time domain value for the current data stream x(n,STR_ID) 151 and the stream ID (STR_ID) 101. Output to the integrate and dump logic block is the time domain value for the current data stream Σx(n,STR_ID) 152.

For the embodiment shown in FIG. 4, to achieve the multi-stream architecture, the incoming and outgoing data streams have peripheral stream ID tags that identify the specific data stream. The "Dump" flag is used to reset the integrator at any point in real-time without a hard reset. There are two stages above: the pre-integration and a recursive integrator. The pre-integration filter acts as a four-point pre-integration, then the fully pipelined integration stage allows for integration for sets of samples greater than four. The stream IDs are aligned via pipelining to assure that access to BRAM is synchronized with the processed data per stream.

Multi-stream FFT block 26 and frequency domain compensation block 27 convert time domain response from fractional template filter 25 to the frequency domain.

Figure 5:
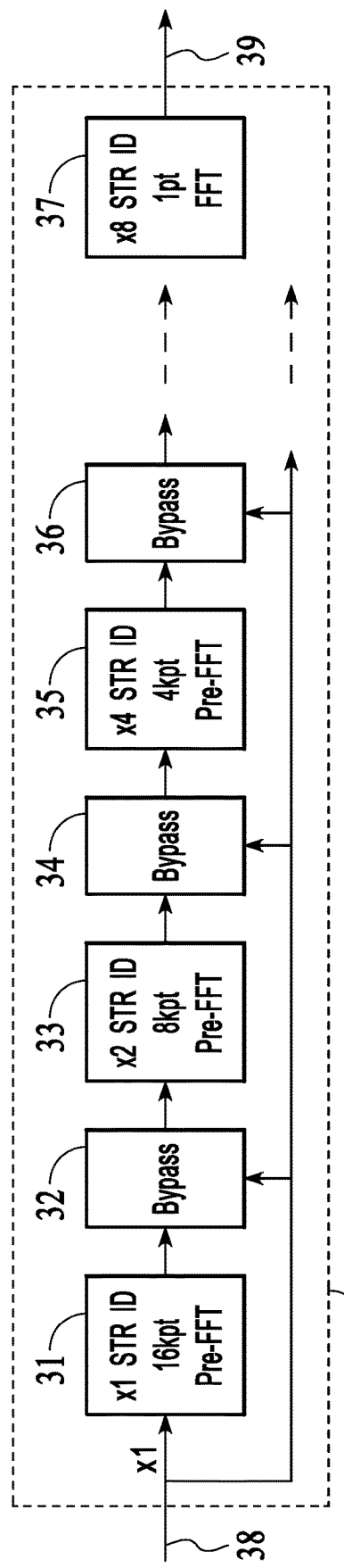
FIG. 5 shows a simplified block diagram of a multi-stream FFT processor.

FIG. 5 is a block diagram of multi-stream FFT block 26. Input 38 from fractional template filter includes a sample of a data stream and a stream ID for the sampled data stream. Multi-stream FFT block 26 is composed of a pipelined stages. Bypass modules are used between FFT stages so that the length of FFT computations can be varied depending upon the needs of each data stream. A shift delay feedback (SDF) architecture is used to optimize memory utilization. However, the feedback loop is unsuitable for the lowest stages of the FFT because of the latency of the feedback loop needed at those lower stages is too short to add pipeline registers. Therefore, a four-point FFT using a multi-delay commutator approach can be used as the last stage. In FIG. 5, the stages are illustrated by a stage 31, a stage 33, a stage 35 and a stage 37. The bypass modules are illustrated by bypass module 32, bypass module 34 and bypass module 36.

Figure 6:
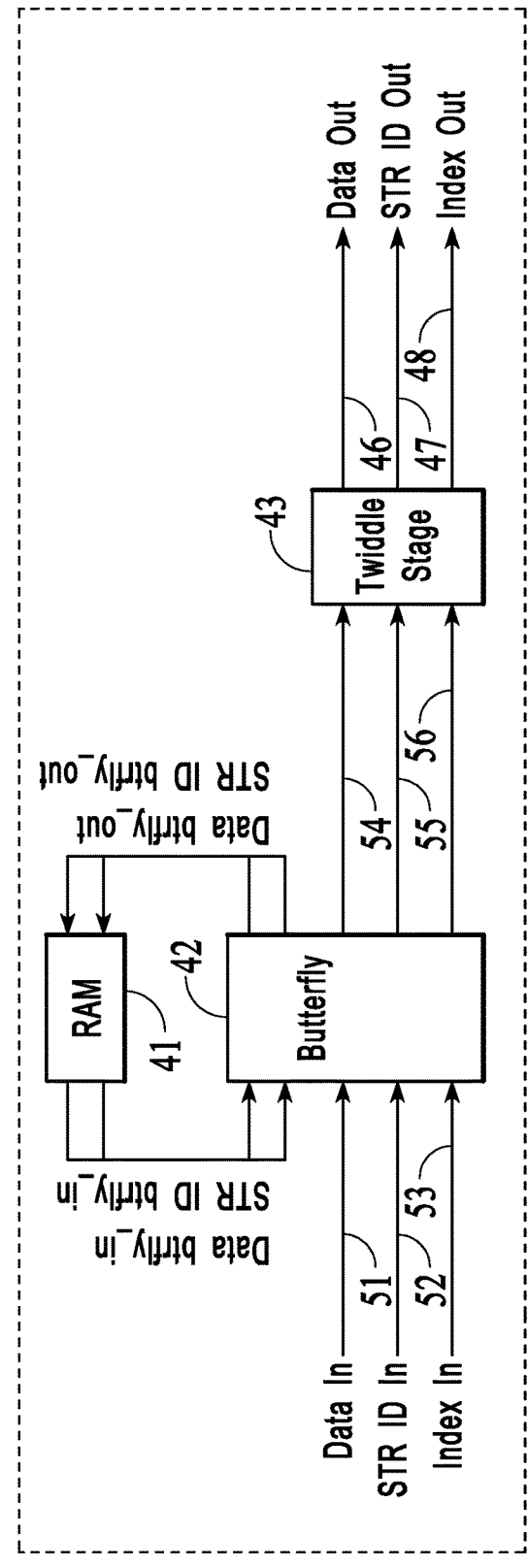
FIG. 6 shows a simplified block diagram of a stage within the multi-stream FFT processor shown in FIG. 5.

FIG. 6 shows a simplified block diagram of an example FFT stage within multi-stream FFT block 26. A butterfly 42 in series with a twiddle stage 43 receives data from a prior stage consisting of a data input 51, a stream ID 52 and an index 53. Twiddle stage 43 outputs data for a next stage, data output 46, a stream ID output 47 and an index output 48. The stream ID identifies the current data stream. The index is the index for the current data stream operation for the data stream identified by the stream ID. Each FFT stage keeps track of the index of the current stream operation. In each butterfly stage the index is adjusted to account for latency in the computation. This eliminates the need to have a centralized butterfly controller of knowledge of each stream ID. Instead a RAM 41 and butterfly index registers are used to save the state of the FFT for each stream so that a controller and thread scheduler is not needed.

As is understood by persons in the art, a butterfly performs a portion of the FFT algorithm that combines smaller discrete Fourier transforms into larger discrete Fourier transforms. The twiddle stage utilizes a rotating vector, which rotates in increments according to the number of samples in the FFT and the current sample index being computed.

Figure 7:
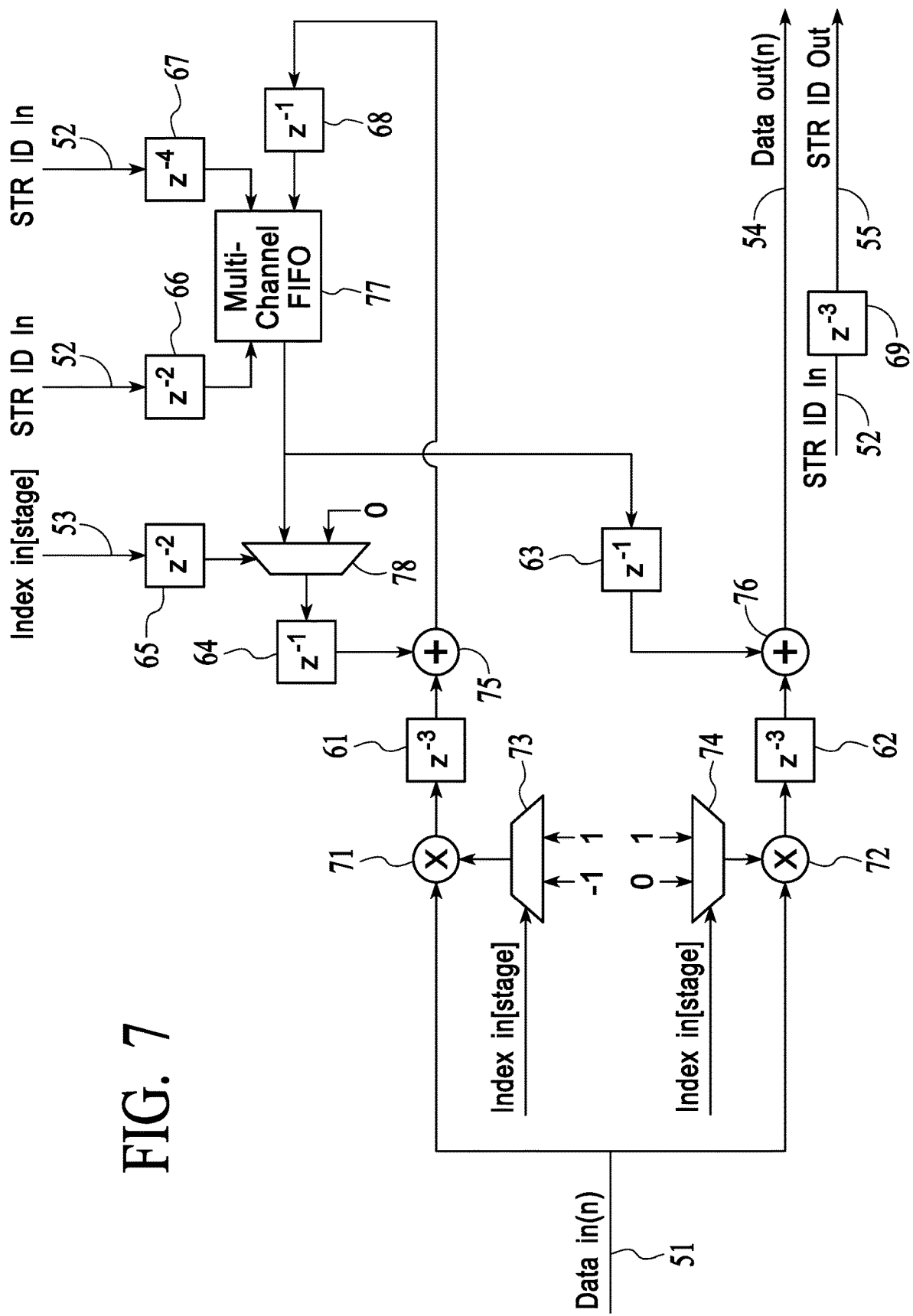
FIG. 7 shows a simplified block diagram of a core butterfly unit within the stage of the multi-stream FFT processor shown in FIG. 6.

FIG. 7 shows a simplified block diagram of butterfly 42. Butterfly 42 is shown to include a multiplier 71, a multiplier 72, a multiplexor 73, a multiplexor 74, a multiplexor 78, an adder 75, an adder 76, a multichannel first-in-first-out (FIFO) memory 77, a delay 61, a delay 62, a delay 63, a delay 64, a delay 65, a delay 66, a delay 67, a delay 68 and a delay 69 connected as shown.

Figure 8:
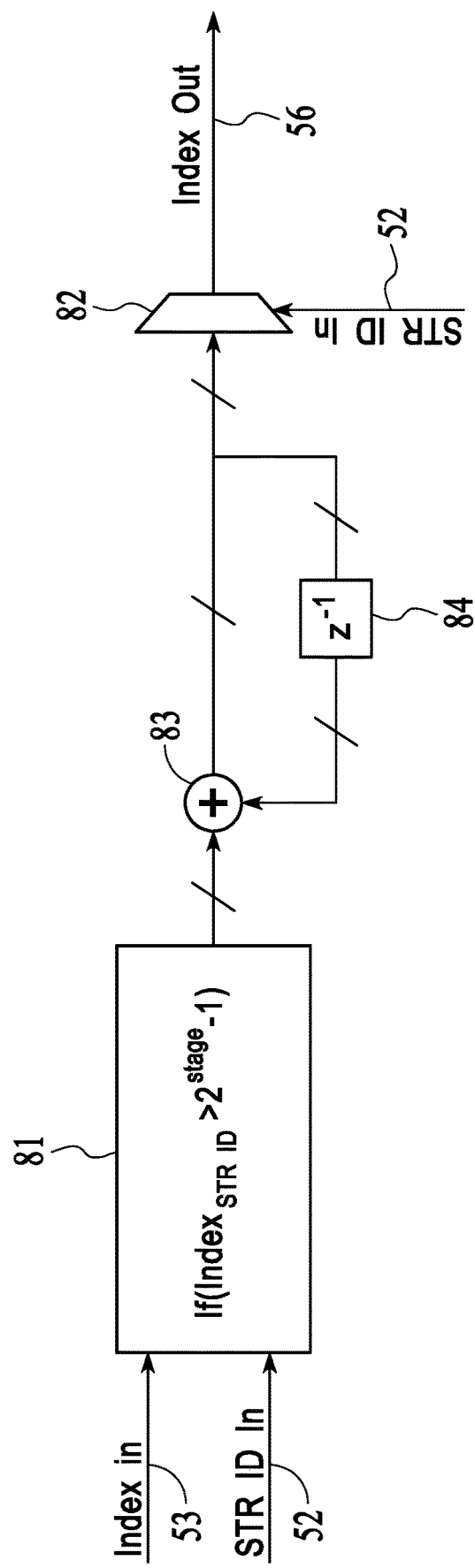
FIG. 8 shows a simplified block diagram for an index update of a core butterfly unit within the stage of the multi-stream FFT processor shown in FIG. 6.

FIG. 8 shows a simplified block diagram for an index update for butterfly 42. The index update incudes conditional control logic 81, a multiplexor 82, an adder 83 and a delay 84 connected as shown.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A device that performs operations on a plurality of streams of data, comprising:
    a frequency domain converter logic that transforms input signal samples of radio frequency (RF) signal impulse response data to frequency domain signal results;
    a first arbiter with a plurality of inputs, each input from the plurality of inputs receiving one stream of data from a plurality of streams of data, wherein each stream of data in the plurality of streams of data includes a stream of RF signal impulse response data, wherein for each arbitration cycle, the first arbiter selects an input signal sample from one of the plurality of inputs to forward to the frequency domain converter logic; and
    a multi-stream first-in-first-out (FIFO) memory that has a separate FIFO buffer for each stream of data in the plurality of streams of data, wherein for each input signal sample transformed by the frequency domain converter logic into a frequency domain signal result, the frequency domain converter logic places the frequency domain signal result into a FIFO buffer of the multi-stream FIFO memory that corresponds to a memory stream from which the input signal sample originated.

2. A device as in claim 1, wherein the multi-stream FIFO memory sends control signals to the first arbiter so that the first arbiter will select inputs so as to keep each FIFO buffer of the multi-stream FIFO memory at or above predetermined minimum levels.

3. A device as in claim 1, wherein each input signal sample is included within a data packet that includes values for a marker, a gain, an integer delay and a fractional delay.

4. A device as in claim 1, wherein the frequency domain converter logic includes:
    a fractional template filter;
    multiple-stream fast Fourier transform logic; and
    frequency domain compensation.

5. A device as in claim 1, additionally comprising:
    a second arbiter connected to output from the multi-stream FIFO memory, the second arbiter during each arbitration cycle of the second arbiter selecting data from one of the FIFO buffers to forward to an interface to an external device.

6. A device as in claim 1, wherein the frequency domain converter logic includes:
    multiple-stream fast Fourier transform (FFT) logic, that includes:
        a plurality of FFT stages that are shared by all the streams of data in the plurality of streams of data, each FFT stage comprising:
            a memory that stores a stream identifier and an index for each data stream of the plurality of data streams, and
            butterfly logic that for each input signal sample a stream identifier and
an index for the data stream of the input signal sample and for the data stream combines results of discrete Fourier transforms (DFTs).

7. A device as in claim 1, wherein the frequency domain converter logic includes:
    a fractional template filter that has a multiple-stream integrator that computes a cumulative sum of multiple streams of incoming data, the multiple-stream integrator including a plurality of memory units, each memory unit being indexed by a stream identifier that is used to track a current data stream being integrated.

8. A device as in claim 1:
    wherein the frequency domain converter logic includes:
        a fractional template filter,
        multiple-stream fast Fourier transform logic, and
        frequency domain compensation; and
    wherein each input signal sample selected by the first arbiter, is accompanied by a stream identifier that propagates through the fractional template filter, the multiple-stream fast Fourier transform logic and the frequency domain compensation as the input signal sample is processed.

9. A method for performing fast Fourier Transforms on a plurality of streams of data, comprising:
    presenting a plurality of stream of data to a plurality of inputs of an arbiter, each input from the plurality of inputs receiving one from a plurality of streams of data, wherein each stream of data in the plurality of streams of data includes a stream of radio frequency (RF) signal impulse response data;
    for each arbitration cycle, selecting by the arbiter an input signal sample from one of the plurality of inputs to forward to a frequency domain converter logic;
    transforming, by the frequency domain converter logic, the input signal sample from radio frequency (RF) signal impulse response data to a frequency domain signal result; and
    placing the frequency domain signal result into a multi-stream first-in-first-out (FIFO) memory that has a separate FIFO buffer for each stream of data in the plurality of streams of data, including:

placing the domain signal result into a FIFO buffer of the multi-stream FIFO memory that corresponds to a memory stream from which the input signal sample originated.

10. A method as in claim 9, additionally comprising:
sending, by the multi-stream FIFO memory, control signals to the arbiter so that the arbiter will select inputs so as to keep each FIFO buffer of the multi-stream FIFO memory at or above predetermined minimum levels.

11. A method as in claim 9, wherein each input signal sample is included within a data packet that includes values for a marker, a gain, an integer delay and a fractional delay.

12. A method as in claim 9, additionally comprising:
selecting, by a second arbiter during each arbitration cycle of the second arbiter, data from one of the FIFO buffers to forward to an interface to an external device.

13. A device that performs operations on a plurality of streams of data, comprising:
transformation logic that receives input signal samples and produces output signal results;
a first arbiter with a plurality of inputs, each input from the plurality of inputs receiving one stream of data from a plurality of streams of data, wherein each stream of data in the plurality of streams of data includes a stream of signal data, wherein for each arbitration cycle, the first arbiter selects an input signal sample from one of the plurality of inputs to forward to the transformation logic; and
a multi-stream first-in-first-out (FIFO) memory that has a separate FIFO buffer for each stream of data in the plurality of streams of data;
wherein for each input signal sample transformed by the transformation logic into a output signal result, the transformation logic places the output signal result into a FIFO buffer of the multi-stream FIFO memory that corresponds to a memory stream from which the input signal sample originated; and
wherein the multi-stream FIFO memory sends control signals to the first arbiter so that the first arbiter will select inputs so as to keep each FIFO buffer of the multi-stream FIFO memory at or above predetermined minimum levels.

14. A device as in claim 13:
wherein the input signal samples are samples of radio frequency (RF) signal impulse response data; and
wherein the output signal results are frequency domain signals.

15. A device as in claim 13, wherein each input signal sample is included within a data packet that includes values for a marker, a gain, an integer delay and a fractional delay.

16. A device as in claim 13, wherein the transformation logic includes:
a fractional template filter;
multiple-stream fast Fourier transform logic; and
frequency domain compensation.

17. A device as in claim 13, additionally comprising:
a second arbiter connected to output from the multi-stream FIFO memory, the second arbiter during each arbitration cycle of the second arbiter selecting data from one of the FIFO buffers to forward to an interface to an external device.

18. A device as in claim 13, wherein the transformation logic includes:
multiple-stream fast Fourier transform (FFT) logic, that includes:
a plurality of FFT stages that are shared by all the streams of data in the plurality of data streams each FFT stage including:
a memory that stores a stream identifier and an index for each data stream of the plurality of data streams, and
butterfly logic that for each input signal sample a stream identifier and
an index for the data stream of the input signal sample and for the data stream combines results of discrete Fourier transforms (DFTs).

19. A device as in claim 13, wherein the transformation logic includes:
a fractional template filter that has a multiple-stream integrator that computes a cumulative sum of multiple streams of incoming data, the multiple stream integrator including a plurality of memory units, each memory unit being indexed by a stream identifier that is used to track a current data stream being integrated.

20. A device as in claim 13:
wherein the transformation logic includes:
a fractional template filter,
multiple-stream fast Fourier transform logic, and
frequency domain compensation; and
wherein each input signal sample selected by the first arbiter, is accompanied by a stream identifier that propagates through the fractional template filter, the multiple stream fast Fourier transform logic and the frequency domain compensation as the input signal sample is processed.

* * * * *